(12) United States Patent
Bell (10) Patent No.: US 8,159,682 B2
(45) Date of Patent: Apr. 17, 2012

(54) LENS SYSTEM

(75) Inventor: Matthew Bell, Palo Alto, CA (US)

(73) Assignee: Intellectual Ventures Holding 67 LLC, Las Vegas, NV (US)

( * ) Notice: Subject to any disclaimer, the term of this patent is extended or adjusted under 35 U.S.C. 154(b) by 170 days.

(21) Appl. No.: 12/269,849

(22) Filed: Nov. 12, 2008

(65) Prior Publication Data

US 2009/0251685 A1 Oct. 8, 2009

Related U.S. Application Data

(60) Provisional application No. 60/987,315, filed on Nov. 12, 2007.

(51) Int. Cl.
*G01B 11/14* (2006.01)
(52) U.S. Cl. ......................................................... 356/614
(58) Field of Classification Search .................... None
See application file for complete search history.

(56) References Cited

U.S. PATENT DOCUMENTS

| | | | | |
|---|---|---|---|---|
| 2,917,980 | A | * | 12/1959 | Grube et al. .................. 396/561 |
| 3,068,754 | A | * | 12/1962 | Warren .......................... 359/592 |
| 3,763,468 | A | * | 10/1973 | Ovshinsky et al. ............. 345/76 |
| 4,053,208 | A | * | 10/1977 | Kato et al. ..................... 359/460 |
| 4,275,395 | A | | 6/1981 | Dewey et al. |
| 4,573,191 | A | | 2/1986 | Kidode et al. |
| 4,725,863 | A | | 2/1988 | Dumbreck et al. |
| 4,843,568 | A | | 6/1989 | Krueger et al. |
| 4,887,898 | A | | 12/1989 | Halliburton et al. |
| 4,948,371 | A | | 8/1990 | Hall |
| 5,001,558 | A | | 3/1991 | Burley et al. |
| 5,138,304 | A | | 8/1992 | Bronson |
| 5,151,718 | A | * | 9/1992 | Nelson .......................... 347/130 |
| 5,239,373 | A | | 8/1993 | Tang et al. |
| 5,276,609 | A | | 1/1994 | Durlach |
| 5,319,496 | A | * | 6/1994 | Jewell et al. .................. 359/741 |
| 5,325,472 | A | | 6/1994 | Horiuchi et al. |
| 5,325,473 | A | | 6/1994 | Monroe et al. |
| 5,426,474 | A | | 6/1995 | Rubstov et al. |
| 5,436,639 | A | | 7/1995 | Arai et al. |
| 5,442,252 | A | * | 8/1995 | Golz ............................. 313/111 |
| 5,454,043 | A | | 9/1995 | Freeman |

(Continued)

FOREIGN PATENT DOCUMENTS

EP 0055366 A2 7/1982

(Continued)

OTHER PUBLICATIONS

EffecTV Version 0.2.0 released Mar. 27, 2001, available online at <http://web.archive.org/web/20010101-20010625re_http://effectv.sourceforge.net>.

(Continued)

*Primary Examiner* — Tarifur Chowdhury
*Assistant Examiner* — Gordon Stock, Jr.
(74) *Attorney, Agent, or Firm* — Knobbe Martens Olson & Bear LLP (57) ABSTRACT

A fragmented lens system for creating an invisible light pattern useful to computer vision systems is disclosed. Random or semi-random dot patterns generated by the present system allow a computer to uniquely identify each patch of a pattern projected by a corresponding illuminator or light source. The computer may determine the position and distance of an object by identifying the illumination pattern on the object.

21 Claims, 4 Drawing Sheets

U.S. PATENT DOCUMENTS

| | | | |
|---|---|---|---|
| 5,497,269 A * | 3/1996 | Gal | 359/615 |
| 5,510,828 A | 4/1996 | Lutterbach et al. | |
| 5,526,182 A * | 6/1996 | Jewell et al. | 359/621 |
| 5,528,263 A | 6/1996 | Platzker et al. | |
| 5,528,297 A | 6/1996 | Seegert et al. | |
| 5,534,917 A | 7/1996 | MacDougall | |
| 5,548,694 A | 8/1996 | Gibson | |
| 5,591,972 A | 1/1997 | Noble et al. | |
| 5,594,469 A | 1/1997 | Freeman et al. | |
| 5,633,691 A | 5/1997 | Vogeley et al. | |
| 5,703,637 A | 12/1997 | Miyazaki et al. | |
| 5,808,784 A * | 9/1998 | Ando et al. | 359/443 |
| 5,861,881 A | 1/1999 | Freeman et al. | |
| 5,882,204 A | 3/1999 | Iannazo et al. | |
| 5,923,380 A | 7/1999 | Yang et al. | |
| 5,923,475 A * | 7/1999 | Kurtz et al. | 359/619 |
| 5,953,152 A | 9/1999 | Hewlett | |
| 5,969,754 A | 10/1999 | Zeman | |
| 5,978,136 A * | 11/1999 | Ogawa et al. | 359/487 |
| 5,982,352 A | 11/1999 | Pryor | |
| 6,008,800 A | 12/1999 | Pryor | |
| 6,058,397 A | 5/2000 | Barrus et al. | |
| 6,075,895 A | 6/2000 | Qiao et al. | |
| 6,084,979 A | 7/2000 | Kanada et al. | |
| 6,088,612 A | 7/2000 | Blair | |
| 6,097,369 A | 8/2000 | Wambach | |
| 6,106,119 A | 8/2000 | Edwards | |
| 6,118,888 A | 9/2000 | Chino et al. | |
| 6,125,198 A | 9/2000 | Onda | |
| 6,166,744 A | 12/2000 | Jaszlics et al. | |
| 6,176,782 B1 | 1/2001 | Lyons et al. | |
| 6,191,773 B1 | 2/2001 | Maruno et al. | |
| 6,198,487 B1 | 3/2001 | Fortenbery et al. | |
| 6,198,844 B1 | 3/2001 | Nomura | |
| 6,263,339 B1 | 7/2001 | Hirsch | |
| 6,292,171 B1 | 9/2001 | Fu et al. | |
| 6,308,565 B1 | 10/2001 | French et al. | |
| 6,323,895 B1 | 11/2001 | Sata | |
| 6,333,735 B1 | 12/2001 | Anvekar | |
| 6,335,977 B1 | 1/2002 | Kage | |
| 6,339,748 B1 | 1/2002 | Hiramatsu | |
| 6,349,301 B1 | 2/2002 | Mitchell et al. | |
| 6,353,428 B1 | 3/2002 | Maggioni et al. | |
| 6,359,612 B1 | 3/2002 | Peter et al. | |
| 6,388,657 B1 | 5/2002 | Natoli | |
| 6,400,374 B2 | 6/2002 | Lanier | |
| 6,407,870 B1 * | 6/2002 | Hurevich et al. | 359/668 |
| 6,414,672 B2 | 7/2002 | Rekimoto et al. | |
| 6,445,815 B1 | 9/2002 | Sato | |
| 6,454,419 B2 | 9/2002 | Kitazawa | |
| 6,480,267 B2 * | 11/2002 | Yanagi et al. | 356/121 |
| 6,491,396 B2 * | 12/2002 | Karasawa et al. | 353/20 |
| 6,501,515 B1 | 12/2002 | Iwamura | |
| 6,522,312 B2 | 2/2003 | Ohshima et al. | |
| 6,545,706 B1 | 4/2003 | Edwards et al. | |
| 6,552,760 B1 * | 4/2003 | Gotoh et al. | 349/56 |
| 6,598,978 B2 | 7/2003 | Hasegawa | |
| 6,607,275 B1 | 8/2003 | Cimini et al. | |
| 6,611,241 B1 | 8/2003 | Firester et al. | |
| 6,654,734 B1 | 11/2003 | Mani et al. | |
| 6,658,150 B2 | 12/2003 | Tsuji et al. | |
| 6,661,918 B1 | 12/2003 | Gordon et al. | |
| 6,677,969 B1 | 1/2004 | Hongo | |
| 6,707,054 B2 | 3/2004 | Ray | |
| 6,707,444 B1 | 3/2004 | Hendriks et al. | |
| 6,712,476 B1 | 3/2004 | Ito et al. | |
| 6,720,949 B1 | 4/2004 | Pryor et al. | |
| 6,732,929 B2 * | 5/2004 | Good et al. | 235/462.01 |
| 6,747,666 B2 | 6/2004 | Utterback | |
| 6,752,720 B1 | 6/2004 | Clapper et al. | |
| 6,754,370 B1 | 6/2004 | Hall-Holt et al. | |
| 6,791,700 B2 | 9/2004 | Omura et al. | |
| 6,826,727 B1 | 11/2004 | Mohr et al. | |
| 6,831,664 B2 | 12/2004 | Marmaropoulos et al. | |
| 6,871,982 B2 * | 3/2005 | Holman et al. | 362/331 |
| 6,877,882 B1 * | 4/2005 | Haven et al. | 362/308 |
| 6,912,313 B2 | 6/2005 | Li | |
| 6,965,693 B1 | 11/2005 | Kondo et al. | |
| 6,975,360 B2 | 12/2005 | Slatter | |
| 6,999,600 B2 | 2/2006 | Venetianer | |
| 7,015,894 B2 | 3/2006 | Morohoshi | |
| 7,042,440 B2 | 5/2006 | Pryor | |
| 7,054,068 B2 * | 5/2006 | Yoshida et al. | 359/624 |
| 7,058,204 B2 | 6/2006 | Hildreth et al. | |
| 7,068,274 B2 | 6/2006 | Welch et al. | |
| 7,069,516 B2 | 6/2006 | Rekimoto | |
| 7,084,859 B1 | 8/2006 | Pryor et al. | |
| 7,088,508 B2 * | 8/2006 | Ebina et al. | 359/455 |
| 7,149,262 B1 | 12/2006 | Nayar et al. | |
| 7,158,676 B1 | 1/2007 | Rainsford | |
| 7,170,492 B2 | 1/2007 | Bell | |
| 7,190,832 B2 | 3/2007 | Frost et al. | |
| 7,193,608 B2 | 3/2007 | Stuerzlinger | |
| 7,227,526 B2 | 6/2007 | Hildreth et al. | |
| 7,259,747 B2 | 8/2007 | Bell | |
| 7,262,874 B2 | 8/2007 | Suzuki | |
| 7,289,130 B1 | 10/2007 | Satoh et al. | |
| 7,330,584 B2 | 2/2008 | Weiguo et al. | |
| 7,339,521 B2 * | 3/2008 | Scheidemann et al. | 342/379 |
| 7,348,963 B2 | 3/2008 | Bell | |
| 7,379,563 B2 | 5/2008 | Shamaie | |
| 7,382,897 B2 | 6/2008 | Brown et al. | |
| 7,394,459 B2 | 7/2008 | Bathiche et al. | |
| 7,428,542 B1 | 9/2008 | Fink et al. | |
| 7,432,917 B2 | 10/2008 | Wilson et al. | |
| 7,536,032 B2 | 5/2009 | Bell | |
| 7,559,841 B2 | 7/2009 | Hashimoto | |
| 7,576,727 B2 | 8/2009 | Bell | |
| 7,598,942 B2 | 10/2009 | Underkoffler et al. | |
| 7,619,824 B2 * | 11/2009 | Poulsen | 359/621 |
| 7,665,041 B2 | 2/2010 | Wilson et al. | |
| 7,710,391 B2 | 5/2010 | Bell et al. | |
| 7,737,636 B2 * | 6/2010 | Li et al. | 313/512 |
| RE41,685 E * | 9/2010 | Feldman et al. | 362/237 |
| 7,809,167 B2 | 10/2010 | Bell | |
| 7,834,846 B1 | 11/2010 | Bell | |
| 2001/0012001 A1 | 8/2001 | Rekimoto et al. | |
| 2001/0033675 A1 | 10/2001 | Maurer et al. | |
| 2002/0006583 A1 * | 1/2002 | Michiels et al. | 430/312 |
| 2002/0032697 A1 | 3/2002 | French et al. | |
| 2002/0041327 A1 | 4/2002 | Hildreth et al. | |
| 2002/0064382 A1 | 5/2002 | Hildreth et al. | |
| 2002/0081032 A1 | 6/2002 | Chen et al. | |
| 2002/0103617 A1 | 8/2002 | Uchiyama et al. | |
| 2002/0105623 A1 | 8/2002 | Pinhanez | |
| 2002/0130839 A1 | 9/2002 | Wallace et al. | |
| 2002/0140633 A1 | 10/2002 | Rafii et al. | |
| 2002/0140682 A1 | 10/2002 | Brown et al. | |
| 2002/0178440 A1 | 11/2002 | Agnihorti et al. | |
| 2002/0186221 A1 | 12/2002 | Bell | |
| 2003/0032484 A1 | 2/2003 | Ohshima et al. | |
| 2003/0076293 A1 | 4/2003 | Mattsson | |
| 2003/0091724 A1 | 5/2003 | Mizoguchi | |
| 2003/0093784 A1 | 5/2003 | Dimitrova et al. | |
| 2003/0098819 A1 | 5/2003 | Sukthankar et al. | |
| 2003/0103030 A1 | 6/2003 | Wu | |
| 2003/0113018 A1 | 6/2003 | Nefian et al. | |
| 2003/0122839 A1 | 7/2003 | Matraszek et al. | |
| 2003/0137494 A1 | 7/2003 | Tulbert | |
| 2003/0161502 A1 | 8/2003 | Morihara et al. | |
| 2003/0178549 A1 | 9/2003 | Ray | |
| 2004/0005924 A1 | 1/2004 | Watabe et al. | |
| 2004/0015783 A1 | 1/2004 | Lennon et al. | |
| 2004/0046736 A1 | 3/2004 | Pryor et al. | |
| 2004/0046744 A1 | 3/2004 | Rafii et al. | |
| 2004/0073541 A1 | 4/2004 | Lindblad et al. | |
| 2004/0091110 A1 * | 5/2004 | Barkans | 380/201 |
| 2004/0095768 A1 * | 5/2004 | Watanabe et al. | 362/337 |
| 2004/0183775 A1 | 9/2004 | Bell | |
| 2005/0088407 A1 | 4/2005 | Bell | |
| 2005/0089194 A1 | 4/2005 | Bell | |
| 2005/0104506 A1 * | 5/2005 | Youh et al. | 313/496 |
| 2005/0110964 A1 * | 5/2005 | Bell et al. | 353/122 |
| 2005/0122308 A1 | 6/2005 | Bell et al. | |
| 2005/0132266 A1 | 6/2005 | Ambrosino et al. | |
| 2005/0147282 A1 | 7/2005 | Fujii | |
| 2005/0162381 A1 | 7/2005 | Bell et al. | |

| | | | |
|---|---|---|---|
| 2005/0185828 | A1 | 8/2005 | Semba et al. |
| 2005/0195598 | A1* | 9/2005 | Dancs et al. ............... 362/231 |
| 2005/0265587 | A1 | 12/2005 | Schneider |
| 2006/0010400 | A1 | 1/2006 | Dehlin et al. |
| 2006/0031786 | A1 | 2/2006 | Hillis et al. |
| 2006/0132432 | A1 | 6/2006 | Bell |
| 2006/0139314 | A1 | 6/2006 | Bell |
| 2006/0168515 | A1 | 7/2006 | Dorsett, Jr. et al. |
| 2006/0184993 | A1 | 8/2006 | Goldthwaite et al. |
| 2006/0187545 | A1* | 8/2006 | Doi ............................ 359/455 |
| 2006/0227099 | A1 | 10/2006 | Han et al. |
| 2006/0242145 | A1 | 10/2006 | Krishnamurthy et al. |
| 2006/0256382 | A1 | 11/2006 | Matraszek et al. |
| 2006/0258397 | A1 | 11/2006 | Kaplan et al. |
| 2006/0294247 | A1 | 12/2006 | Hinckley et al. |
| 2007/0285419 | A1 | 12/2007 | Givon |
| 2008/0040692 | A1 | 2/2008 | Sunday et al. |
| 2008/0062123 | A1 | 3/2008 | Bell |
| 2008/0090484 | A1* | 4/2008 | Lee et al. ......................... 445/49 |
| 2008/0150890 | A1 | 6/2008 | Bell et al. |
| 2008/0150913 | A1 | 6/2008 | Bell et al. |
| 2008/0170776 | A1 | 7/2008 | Albertson et al. |
| 2008/0245952 | A1* | 10/2008 | Troxell et al. ............... 250/208.1 |
| 2008/0252596 | A1 | 10/2008 | Bell et al. |
| 2009/0027337 | A1 | 1/2009 | Hildreth |
| 2009/0077504 | A1 | 3/2009 | Bell et al. |
| 2009/0102788 | A1 | 4/2009 | Nishida et al. |
| 2009/0225196 | A1 | 9/2009 | Bell |
| 2009/0235295 | A1 | 9/2009 | Bell et al. |
| 2010/0026624 | A1 | 2/2010 | Bell et al. |
| 2010/0039500 | A1 | 2/2010 | Bell et al. |
| 2010/0060722 | A1 | 3/2010 | Bell et al. |
| 2010/0121866 | A1 | 5/2010 | Bell et al. |

FOREIGN PATENT DOCUMENTS

| | | |
|---|---|---|
| EP | 0626636 A2 | 11/1994 |
| EP | 0913790 A1 | 5/1999 |
| EP | 1689172 A1 | 6/2002 |
| JP | 57094672 | 6/1982 |
| JP | 2000-105583 | 4/2000 |
| JP | 2002-014997 | 1/2002 |
| JP | 2002-092033 | 3/2002 |
| JP | 2002-171507 | 6/2002 |
| JP | 2003-517642 | 5/2003 |
| JP | 2003-271084 | 9/2003 |
| KR | 2003-0058894 | 7/2003 |
| WO | WO 98/38533 | 9/1998 |
| WO | WO 00/16562 | 3/2000 |
| WO | WO 01/63916 | 8/2001 |
| WO | WO 02/01537 A2 | 1/2002 |
| WO | WO 02/100094 A2 | 12/2002 |
| WO | WO 2004/055776 | 7/2004 |
| WO | WO 2004/097741 A1 | 11/2004 |
| WO | WO 2005/041578 A2 | 5/2005 |
| WO | WO 2005/041579 A3 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

Index of EffecTV, as downloaded on Apr. 30, 2007 at <http://effectv.cvs.sourceforge.net/effectv/EffecTV/?pathrev=rel_0_2_0>.

R111, The Transformation From Digital Information to Analog Matter, available online at <http://www.particles.de/paradocs/r111/10mkp2004/hmtl/r111_text111hock04.html>.

2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of European Application No. 02739710.8 filed Jun. 4, 2002.

Affidavit of Daniel Barthels regarding EffecTV, dated May 15, 2007 (partial machine translation), cited during opposition of European Application No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at <http://www.research.microsoft.com/PUIWorkshop/>, cited during opposition of European Application No. 02739710.8, filed Jun. 4, 2002.

Bodymover Body Movement as a Means to Obtain an Audiovisual Spatial Experience, 2000 ART+COM AG Berlin; <http://www.artcome/de/index.php?option=com_acprojects&page=6&id=28&itemid=144&details=0&lang=en>.

ART+COM Bodymover 2000, as downloaded on Aug. 21, 2009 from <http://www.artcom.de/index.php?option=com_acprojects&page=6&id=28&itemid=144&details=0&lang=en>, cited during opposition of European Application No. 02739710.8, filed Jun. 4, 2002.

Article 96(2) Communication dated Feb. 25, 2005 in European Application No. 02739710.8.

Article 96(2) Communication dated Mar. 31, 2004 in European Application No. 02739710.8.

Brown, Matthew, et al. "Multi-Image Matching using Multi-Scale Oriented Patches," Technical Report, Dec. 2004, pp. 1-48, available online at <ftp://ftp.research.microsoft.com/pub/tr/TR-2004-133.pdf>.

Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.

Buxton, Bill, "Multi-Touch Systems That I Have Known and Loved," accessed Mar. 21, 2007, http://billbuxton.com/multitouchOverview.html.

Communication dated Dec. 10, 2008 from Patentanwalt attaching article by Katy Bachman, entitled "Reactrix Up for Sale," cited during opposition of European Application No. 02739710.8, filed Jun. 4, 2002.

Crouser, P.D., et al., "Unattenuated tracer particle extraction through time-averaged, background image subtraction with outlier rejection," Experiments in Fluids, 22, 1997, 220-228, Springer-Verlag.

Davis, J.W., et al., "SIDEshow: A Silhouette-based Interactive Dual-screen Environment," Aug. 1998, MIT Media Lab Tech Report No. 457.

Demarest, Ken, "Sand," 2000, Mine Control, art installation, available online at <http://www.minecontrol.com>.

EffecTV Software Source: effect module, dated May 20, 2001 (German); cited during opposition of European Application No. 02739710.8, filed Jun. 4, 2002.

Elgammal, Ahmed, et al., "Non-parametric Model for Background Subtraction," Jun. 2000, European Conference on Computer Vision, Lecture Notes on Computer Science, vol. 1843, pp. 751-767.

Extended Search Report for European Application No. 06010825.5, filed Jun. 4, 2002, dated Jul. 10, 2006.

Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM-2002, pp. 155-163.

Foerterer, Holger, "Fluidum," 1999, art installation, description available online at <http://www.foerterer.com/fluidum>.

Foerterer, Holger, "Helikopter," 2001, art installation, description available online at <http://www.foerterer.com/helikopter>.

Freeman, William, et al., "Computer vision for interactive computer graphics," May-Jun. 1998, IEEE Computer Graphics and Applications, vol. 18, No. 3, pp. 42-53.

Frisken, Sarah F. et al., "Adaptively Sampled Distance Fields: A General Representation of Shape for Computer Graphics," 2000, Proc. of the 27th Annual Conf. on Computer Graphics and Interactive Techniques, pp. 249-254.

Fujihata, Masaki, "Beyond Pages," 1995, art installation, description available online at <http://on1.zkm.de/zkm/werke/BeyondPages>.

Goetz, Frank, et al., "An XML-based Visual Shading Language for Vertex and Fragment Shaders," 3D Technologies for the World Wide Web, Proceedings of Ninth International Conference on 3D Technology; ACM-2004; pp. 87-97.

GroundFX Document, GestureTek (Very Vivid, Inc.), description available online at <http://www.gesturetek.com/groundfx>, downloaded on Aug. 11, 2006.

Haller, Michael et al., "Coeno-Storyboard: An Augmented Surface for Storyboard Presentations," Mensch & Computer 2005, Sep. 4-7, 2005, Linz, Austria.

Han, Jefferson Y., "Low-Cost Multi-Touch Sensing Through Frustrated Total Internal Reflection," 2005, ACM Symposium on User Interface Software and Technology (UIST).

Harville, Michael et al., ""Foreground Segmentation Using Adaptive Mixture Models in Color and Depth,"" 2001, Proc of IEE Workshop on Detection and Recognition of Events in Video, pp. 3-11.

Hemmer, Raphael Lozano, "Body Movies," 2002, art project/installation, description available online at <http://www.lozano-hemmer.com/eproyecto.html>.

Hoff, Kenneth E. III et al, "Fast and Simple 2D Geometric Proximity Queries Using Graphics Hardware," 2001, Proc. of the 2001 Symposium on Interactive 3D Graphics, pp. 145-148.

International Preliminary Examination Report for PCT/US2002/017843, filed Jun. 4, 2002.

International Preliminary Report on Patentability for PCT/US2004/035477, filed Oct. 25, 2004.

International Preliminary Report on Patentability for PCT/US2004/035478, filed Oct. 25, 2004.

International Preliminary Report on Patentability for PCT/US2004/041318, filed Dec. 9, 2004.

International Preliminary Report on Patentability for PCT/US2004/041319, filed Dec. 9, 2004.

International Preliminary Report on Patentability for PCT/US2004/041320, filed Dec. 9, 2004.

International Preliminary Report on Patentability for PCT/US2005/008984, filed Mar. 18, 2005.

International Preliminary Report on Patentability for PCT/US2006/030720, filed on Aug. 4, 2006.

International Preliminary Report on Patentability for PCT/US2008/059900, filed on Apr. 10, 2008.

International Search Report for PCT/US03/40321, filed Dec. 15, 2003.

International Search Report for PCT/US2002/017843, filed Jun. 4, 2002.

International Search Report for PCT/US2004/035477, filed Oct. 25, 2004.

Invitation to Pay Additional Fees and Partial ternational Search Report on Patentability for PCT/US2004/035478, filed Oct. 25, 2004.

International Search Report for PCT/US2004/035478, filed Oct. 25, 2004.

International Search Report for PCT/US2004/041318, filed Dec. 9, 2004.

International Search Report for PCT/US2004/041319, filed Dec. 9, 2004.

International Search Report for PCT/US2004/041320, filed Dec. 9, 2004.

International Search Report for PCT/US2005/008984, filed Mar. 18, 2005.

International Search Report for PCT/US2006/030720, filed Aug. 4, 2006.

International Search Report for PCT/US2008/059900, filed Apr. 10, 2008.

International Search Report for PCT/US2008/10750, filed Sep. 15, 2008.

Ivars Peterson, "Artificial reality; combining a person's live video image with computer graphics suggests novel ways of working and playing with computers" Science News, Jun. 22, 1985.

Jabri, Sumer et al., "Detection and Location of People in Video Images Using Adaptive Fusion of Color and Edge Information;" presented at the Int. Conf. Pattern Recognition, Barcelona, Spain, 2000.

Joyce, Arthur W. III, et al., "Implementation and capabilities of a virtual interaction system," 1998, Proc. 2nd Euro. Conf. Disability, Virtual Reality & Assoc. Tech., Skovde, Sweden, pp. 237-245.

Katz, Itai et al., "A Multi-Touch Surface Using Multiple Cameras," 2007, Advanced Concepts for Intelligent Vision Systems, vol. 4678/2007.

Keays, Bill, "metaField Maze," 1998, exhibited at Siggraph'99 Emerging Technologies and Ars Electronica 1999, description available online at <http://www.billkeays.com/metaFieldInfosheet1A.pdf>.

Keays, Bill, "Using High-Bandwidth Input/Output in Interactive Art," Jun. 1999, Master's Thesis, Massachusetts Institute of Technology, School of Architecture and Planning.

Khan, Jeff; "Intelligent Room with a View"; Apr.-May 2004, RealTime Arts Magazine, Issue 60, available online at www.realtimearts.net/article/60/7432.

Kjeldesn, Rick et al., "Dynamically Reconfigurable Vision-Based User Interfaces," Apr. 2003, 3rd International Conference on Vision Systems (ICVVS '03), Graz, Austria, pp. 6-12.

Kjeldsen, R. et al., "Interacting with Steerable Projected Displays," 2002, Proc. of the 5th International Conference on Automatic Face and Gesture Recognition, Washington, D.C.

Kreuger, Myron, "Videoplace—An Artificial Reality," Apr. 1985, Conference on Human Factors in Computing Systems, San Francisco, California, pp. 35-40.

Kreuger, Myron, "Videoplace," 1969 and subsequent, summary available online at <http://www.jtnimoy.com/itp/newmediahistory/videoplace>.

Kurapati, Kaushal, et al., "A Multi-Agent TV Recommender," 2001, Workshop on Personalization in Future TV, pp. 1-8, XP02228335.

Lamarre, Mathieu, et al., "Background subtraction using competing models in the block-DCT domain," Pattern Recognition, 2002 Proceedings, 16 International Conference in Quebec City, Que., Canada, Aug. 11-15, 2002, Los Alamitos, CA, USA, IEEE Comput Soc US.

Lantagne, Michel, et al., "VIP: Vision tool for comparing Images of People," Vision Interface 2003, pp. 1-8.

Leibe, Bastian, et al., "Towards Spontaneous Interaction with the Perceptive Workbench, a Semi-Immersive Virtual Environment," Nov./Dec. 2000, IEEE Computer Graphics and Applications, vol. 20, No. 6, pp. 54-65.

Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.

Levin, Golan "Computer Vision for Artists and Designers: Pedagogic Tools and Techniques for Novice Programmers," Aug. 2006, AI & Society, vol. 20, Issue 4, pp. 462-482.

Letter dated May 16, 2007 from Christian Zuckschwerdt regarding EffecTV, (partial machine translation), cited during opposition of European Application No. 02739710.8, filed Jun. 4, 2002.

Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-111.

Livingston, Mark Alan, "Vision-based Tracking with Dynamic Structured Light for Video See-through Augmented Reality," 1998, Ph.D. Dissertation, University of North Carolina at Chapel Hill.

Malik, Shahzad et al., "Visual Touchpad: A Two-Handed Gestural Input Device," Oct. 13-15, 2004, International Conference on Multimodal Interfaces (ICMI '04).

MacIver, Malcolm, et al., "Body Electric," 2003, art installation, description available online at <http://www.neuromech.northwestern.edu/uropatagium/#ArtSci>.

Mandala Systems, "Video Gesture Control System Concept," 1986, description available online at <http://www.vividgroup.com/tech.html>.

Microsoft Surface multi-touch interface table unveiled, May 30, 2007, downloaded from http://www.dancewithshadows.com/tech/microsoft-surface.asp.

Microsoft Surface Web Page, downloaded from http://www.microsoft.com/surface/Pages/Product/WhatIs.aspx on Sep. 24, 2009.

Experience Microsoft Surface, downloaded from http://www.microsoft.com/surface/Pages/Product/Specifications.aspx on Sep. 24, 2009.

Microsoft Surface, downloaded from http://en.wikipedia.org/wiki/Microsoft_surface on Sep. 24, 2009.

Mitsubishi DiamondTouch, http://www.merl.com/projects/DiamondTouch/, visited Mar. 21, 2007.

Mo, Zhenyao "SmartCanvas: A Gesture-Driven Intelligent Drawing Desk System," Jan. 9-12, 2005, Proceedings of Intelligent User Interfaces (IUI '05).

Morano, Raymond A. et al., "Structured Light Using Pseudorandom Codes," Mar. 1998, IEEE Transactions on Pattern Analysis and Machine Intelligence, vol. 20, No. 3.

Morris, T. et al., "Real-Time Fingertip Detection for Hand Gesture Recognition," Sep. 9-11, 2002, Advanced Concepts for Intelligent Vision Systems (ACIVS '04), Ghent University, Belgium.

Muench, Wolfgang, "Bubbles", 1999 Prix Ars Electonica Catalog 1999, Springer-Verlag, Berlin, Germany; available online at <http://hosting/zkm/de/wmuench/bub/text>.

Notice of Opposition in European Application No. 02739710.8 dated May 14, 2007.

Observation by third party Michael Saup dated Jan. 17, 2005, cited during opposition of European Application No. 02739710.8, filed Jun. 4, 2002.

Observation by third party Petra Trefzger dated Jan. 17, 2005, cited during opposition of European Application No. 02739710.8, filed Jun. 4, 2002.

Observation by third party Simon Penny dated Jan. 17, 2005, cited during opposition of European Application No. 02739710.8, filed Jun. 4, 2002.

Paradiso, Joseph et al., "New Sensor and Music Systems for Large Interactive Surfaces," 2000, proc. of the Interactive Computer Music Conference, Berlin, Germany, pp. 277-280.

Penny, Simon, "Fugitive"; 1995-7; <http://www.ace.uci.edu/penny/works/fugitive/fugitive.html>.

Penny, Simon, et al., "Fugitive II, " 2004, Australian Center for the Moving Image, art installation, description available online at <http://www.acmi.net.au/fugitive.jsp?>.

Penny, Simon, et al.; Traces: Wireless full body tracking in the CAVE, Dec. 99; Japan; ICAT Virtual Reality Conference; <http://turing.ace.uci.edu/pennytexts/traces/>.

Pinhanez, C. et al., "Ubiquitous Interactive Graphics," 2002, IBM Research Report RC22495, available at <http://www.research.ibm.com/ed/publications/rc22495.pdf>.

Pinhanez, C., "The Everywhere Displays Projector: A Device to Create Ubiquitous Graphical Interfaces," 2001, Proc. of the UbiComp 2001 Conference, Ubiquitous Computig Lecture Notes in Computer Science, Springer-Verlag, Berlin, Germany, pp. 315-331.

Plasma; 3 pages; <http://www.particles.de/paradocs/plasma/index.html>, cited in U.S. Appl. No. 10/160,217 on Aug. 8, 2005.

Reactrix, Inc. website, Mar. 28, 2003, <http://web.archive.org/web/20030328234205/http://www.reactrix.com> and <http://web.archive.org/web/20030328234205/http://www.reactrix.com/webdemo.php>.

Rekimoto, J., et al., "Perceptual Surfaces: Towards a Human and Object Sensitive Interactive Display," 1997, Proc. of the Workshop on Perceptual User Interfaces, Banff, Canada, pp. 30-32.

Ringel, M. et al., "Barehands: Implement-Free Interaction with a Wall-Mounted Display," 2001, Proc. of the 2001 ACM CHI Conference on Human Factors in Computing Systems (Extended Abstracts), p. 367-368.

Rogala, Miroslaw, "Lovers Leap," 1994, art installation, Dutch Electronic Arts Festival, description available online at <http://wayback.v2.nl/DEAF/persona/rogala.html>.

Rokeby, David, "Very Nervous System (VNS)," Mar. 1995, Wired Magazine, available online at <http://www.wired.com/wired/archive/3.03/rokeby.html; sold as software at <http://homepage.mac.com/davidrokeby/softVNS.html>.

Rokeby, David, "softVNS 2 real time video processing and tracking software for Max;" SoftVNS 2 downloads, as downloaded from <http://homepage.mac.com/davidrokeby/softVNS.html> on Mar. 16, 2007.

Sato, Yoichi, et al., "Fast Tracking of Hands and Fingertips in Infrared Images for Augmented Desk Interface," Mar. 2000, 4th International Conference on Automatic Face -and Gesture-Recognition, Grenoble, France.

Schneider, John K., "Improved Fingerprint System Using Rolled and Multi-segmented Techniques," U.S. Appl. No. 60/575,952, filed Jun. 1, 2004, pp. 1-6.

Screenshots of Reactrix Product Demo Video, Mar. 28, 2003, <http://web.archive.org/web/20030407174258/http://www.reactrix.com/demo/reactrix_demo.wmv>.

Sester, Marie, "Access," 2001, Interaction 99 Biennial Catalog, Gifu, Japan, available online at <http://www.accessproject.net/concept.html>.

Snibbe, Scott, "Boundary Functions," 1998, art installation, description available online at <http://snibbe.com/scott/bf/index.html>.

Snibbe, Scott, "Screen Series," 2002-2003 art installation, description available online at <http://snibbe.com/scott/screen/index.html>.

Sonneck, Georg, et al., "Optimized One-to-One Personalization of Web Applications using a Graph Based Model," IEEE-22, Apr. 26, 2003, 9 pgs.

Sparacino, Flavia, et al., "Media in performance: interactive spaces for dance, theater, circus and museum exhibits," 2000, IBM Systems Journal, vol. 39, No. 3-4, pp. 479-510.

Sparacino, Flavia, "(Some) computer visions based interfaces for interactive art and entertainment installations," 2001, INTER_FACE Body Boundaries, Anomalie digital_arts, No. 2, Paris, France.

Stauffer, Chris, et al., "Learning Patterns of Activity Using Real-Time Tracking," Aug. 2000, IEEE Transaction on Pattern Analysis and Machine Intelligence, vol. 22, No. 8, pp. 747-757.

Summons to Attend Oral Proceedings in European Application No. 02739710.8, dated Aug. 12, 2005.

Summons to Attend Oral Proceedings in European Application No. 02739710.8, dated Jun. 12, 2009.

Supreme Particles, "PLASMA/Architexture," 1994, available online at <http://www.particles.de/paradocs/plasma/index.html>.

Supreme Particles; R111, 1999, available online at <http://www.r111.org>, XP-002989704.

Tan, P, et al., "Highlight Removal by Illumination-Constrained Inpainting," Ninth IEEE International Conference on Computer Vision, 2003.

The History of Microsoft Surface, downloaded from http://www.microsoft.com/presspass/presskits/surfacecomputing/docs/SurfaceHistoryBG.doc on Sep. 24, 2009.

Torr, P.H.S. et al., "The Development and Comparison of Robust Methods for Estimating the Fundamental Matrix," 1997, International Journal of Computer Vision, vol. 24, No. 3, pp. 271-300.

Toth, Daniel et al., ""Illumination-Invariant Change Detection,"" 2000 4th IEEE Southwest Symposium on Image Analysis and Interpretation, p. 3.

Trefzger, Petra, ""Vorwerk,"" 2000, art installation, description available online at <http://www.petracolor.de>.

Utterback, Camille, et al., "Text Rain,"1999, art installation, available online at <www.camilleutterback.com/textrain.html>.

Vogt, Florian et al., "Highlight Substitution in Light Fields," IEEE International Conference on Image Processing 2002.

Wang, Junxian, et al., "Specular reflection removal for human detection under aquatic environment," 2004 IEEE Conference on Computer and Pattern Recognition Workshop (CVPRW04) vol. 8, p. 130.

Wellner, Pierre, "Interacting with paper on the DigitalDesk," Jul. 1993, Communications of the ACM, Special issue on computer augmented environments: back to the real world, vol. 36, Issue 7, pp. 87-96.

Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.

Wilson, Andrew, "PlayAnywhere: A Compact Interactive Tabletop Projection-Vision System," ACM Symposium on User Interface Software and Technology (UIST), 2005.

Written Opinion for PCT/US2002/017843, filed Jun. 4, 2002, dated Feb. 5, 2003.

Written Opinion of the International Searching Authority for PCT/US2004/035477, filed Oct. 25, 2004.

Written Opinion of the International Searching Authority for PCT/US2004/035478, filed Oct. 25, 2004.

Written Opinion of the International Searching Authority for PCT/US2004/041318, filed Dec. 9, 2004.

Written Opinion of the International Searching Authority for PCT/US2004/041319, filed Dec. 9, 2004.

Written Opinion of the International Searching Authority for PCT/US2004/041320, filed Dec. 9, 2004.
Written Opinion of the International Searching Authority for PCT/US2005/008984, filed Mar. 18, 2005.
Written Opinion of the International Searching Authority for PCT/US2006/030720, filed Aug. 4, 2006.
Written Opinion of the International Searching Authority for PCT/US2008/059900, filed Apr. 10, 2008.
Provision of the minutes in European Application No. 02739710.8 dated Dec. 28, 2009.
Decision revoking the European Patent in European Application No. 02739710.8 dated Dec. 28, 2009.
International Preliminary Report on Patentability for PCT/US2008/10750, filed Sep. 15, 2008.
Letter of the opponent O2 dated May 28, 2010 in European Application No. 02739710.8, filed Jun. 4, 2002.
Notice of Opposition in European Application No. 02739710.8, dated Aug. 23, 2010.
Official Report in Australian Application No. 2008299883, dated Dec. 8, 2010.
Rekimoto, Jun, "SmartSkin: An Infrastructure for Freehand Manipulation on Interactive Surfaces." vol. No. 4, Issue No. 1, pp. 113-120, Apr. 2002.
Xiao, Yang; "Throughput and Delay Limits of IEEE 802.11," IEEE Communications Letters, vol. 6, No. 8, pp. 355-357, Aug. 2002.
Maria Langer, "Mac OS X 10.2: Visual QuickStart Guide," Sep. 17, 2002, Peachpit Press, p. 111.

* cited by examiner

LENS SYSTEM

CROSS-REFERENCE TO RELATED APPLICATIONS

The present application claims the priority benefit of U.S. provisional patent application No. 60/987,315 filed Nov. 12, 2007 and entitled "Fragmented Lens System," the disclosure of which is incorporated herein by reference.

BACKGROUND OF THE INVENTION

1. Field of the Invention

The present invention generally relates to interactive display systems. More specifically, the present invention relates to a lens system as might be used by an illuminator in an interactive display system.

2. Description of the Related Art

If a computer vision system uses a two-dimensional camera input and background subtraction, a random or semi-random dot pattern allows the system to more reliably detect objects that are at a different distance from a background. If the pattern is too regular, however, the object may disappear relative to the background when at a particular distance. This is a result of too many parts of a texture looking alike. Determinations as to the position of objects (or a more accurate indication thereof) therefore suffer. As a result, users may attempt to interact with an object (e.g., grab an object) that is not where the interactive display system otherwise indicates the object to presently be located. There is, therefore, a need for a system that may create lighting patterns useful to computer vision systems and to allow for more accurate tracking and determination of object positions in space.

SUMMARY OF THE CLAIMED INVENTION

In a first claimed embodiment, a system for projecting a pattern of light is disclosed. The system includes a light source (an illuminator) including multiple emitters of light. The emitters are arranged in a pattern. The system further includes a cluster of lenses located in front of the light source. The cluster of lenses focuses and projects light from the emitters in numerous directions. The focused and projected light forms a pattern of light. A camera detects the pattern of light on an object illuminated by the emitters. A computing device executes instructions stored in memory to determine a location of the object in space utilizing at least the detected pattern of light on the object.

In a variation of the aforementioned embodiment, the system may include a cluster of infrared light emitting diodes (LEDs). The light emitting diodes generate infrared light that is detectable by the camera but not by the eye of a human observer interacting with the object. The system may alternatively (or additionally) include a condenser lens located between the light source and the cluster of lenses. The condenser lens concentrates light from the light source to the cluster of lens.

A second claimed embodiment of the present invention is for a method for projecting a pattern of infrared light. Through this claimed method, light is emitted from a light source (an illuminator) including multiple emitters arranged in a pattern. A cluster of lenses focuses and projects the emitted light, the cluster of lenses located in front of the light source. The focused and projected light forms a pattern of light. That pattern is detected on an object illuminated by the emitters. As a result, the location of an object in space may be determined utilizing at least the detected pattern of light on the object. The location of the object may be determined by a computing device executing instructions stored in memory (e.g., a program).

DETAILED DESCRIPTION

The presently disclosed lens system may create an invisible light pattern that is useful to computer vision systems. If a computer vision system utilizes a pattern matching algorithm to identify position and distance of objects from a camera, the random or semi-random dot pattern generated by the present system allows the computer to uniquely identify each patch of the pattern projected by the illuminator. As a result, the computer may determine the position and distance of an object by identifying the illumination pattern on the object. The computer may make this determination by executing instructions corresponding to a computer program stored in memory. Results of these determinations may then be rendered on a display device, which may include user manipulation of an object on the display.

In a system where a computer vision system utilizes a stereo camera and a stereopsis algorithm to match features between two or more camera images, the vision system will attempt to find matches between texture patches in the different images. The disparity between these patches gives an indication of depth. The compared texture patches often lie along the same horizontal line in the two images. The presently disclosed lens system allows for patterned illumination that better ensures that all objects have texture thereby ensuring good performance by the stereo algorithm. This is especially true with respect to the axis along which the vision algorithm matches texture patches, is very important. The detected pattern may be aperiodic along one or more dimensions in this regard.

In this context, an embodiment of the presently disclosed invention provides for a lens system that may be used in conjunction with an illuminator to create an invisible random, semi-random, partially random, or repeating pattern useful to a computer vision system like those disclosed in U.S. Pat. No. 7,259,747 and U.S. patent application Ser. No. 12/100,737 (subsequently referred to as the '747 patent and '737 application, respectively). The system includes a lighting source composed of a pattern of light emitters, an optional condenser lens or similar hardware to focus emitted light onto a common area (namely a lens cluster), and a lens cluster containing multiple lenses. Each lens of the lens cluster may be of a similar focal length and/or designed to displace an image of the emitter pattern by a particular distance.

Figure 1:
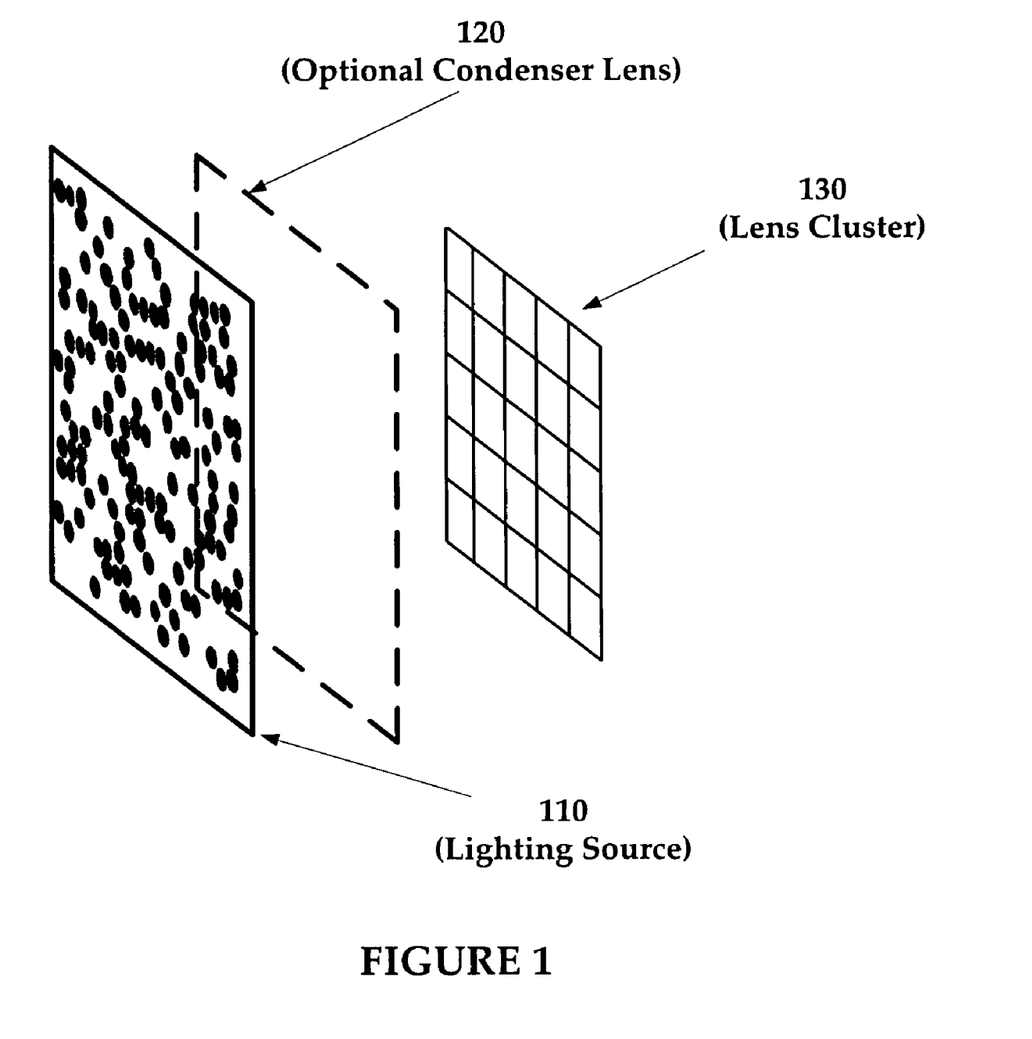
FIG. 1 illustrates an exemplary lens system including a lighting source, an optional condenser lens, and lens cluster.

FIG. 1 illustrates the aforementioned exemplary lens system 100 including a lighting source 110 (such as an illuminator), an optional condenser lens 120, and lens cluster 130. Light emitted from lighting source 110 is re-aimed by condenser lens 120 so that the light is directed towards the center of lens cluster 130. Lens cluster 130 then focuses and projects light from the emitters in numerous directions. The focused and projected light forms a pattern of light, which may be detected by a camera so that a computing device may determine a location of an object in space utilizing at least the detected pattern of light on the object. This determination may involve the execution of instructions corresponding to a program stored in memory.

Lighting source 110 may be akin to the lamp of the '747 patent. A lamp (like lamp 2 of FIG. 1 of the '747 patent) may illuminate a person(s) or other object(s). The lighting source 110 of the present application may also may be comparable to the light source of component 10 in FIG. 2 of the '747 patent. Lighting source 110 may also be configured in a manner similar to those illustrated in FIGS. 3 and 4 of the '747 patent.

Figure 2:
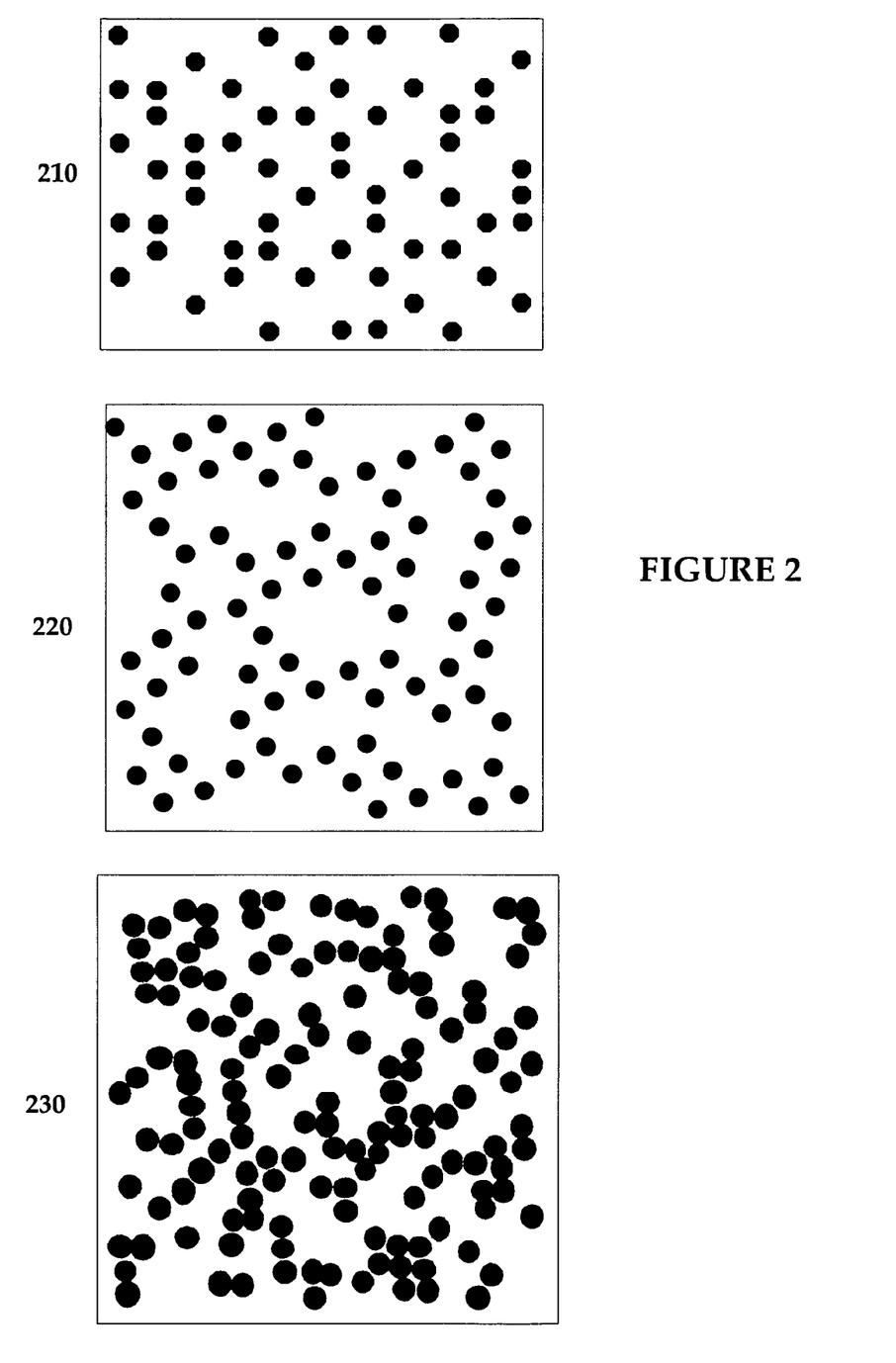
FIG. 2 illustrates a number of semi-random light configurations for the lighting source of FIG. 1.

Light source 110 includes any number of emitters as are further discussed in the context of FIG. 2. Each emitter may be mounted such that it emits light in a cone perpendicular to the surface of lighting source 110. If each emitter emits light in a cone, the center of the cone may be aimed at the center of lens cluster 130. Aiming may involve an optional intermediate lens (like condenser lens 120). The angle of the cone of light produced by the emitters may be chosen such that the cone will completely cover the surface of lens cluster 130. In an embodiment omitting a condenser lens, the lighting source 110 may focus light onto lens cluster 130 on its own. For example, each emitter at the lighting source 110 may be individually be angled with respect to the lens cluster 130.

Optional condenser lens 120 redirects light from each of the emitters in light source 110. Condenser lens 120 may be substituted with hardware or some other component similarly capable of concentrating and/or redirecting light. Condenser lens 120 reduces wasted light by redirecting the emitters' light toward the center of the lens cluster 130 thereby seeking to ensure that as much emitted light as possible passes through lens cluster 130. Implementations of condenser lens 130 may include a convex lens, a plano-convex lens, a Fresnel lens, a set of micro-lenses, one or more prisms, or a prismatic film.

The focal length of the lenses in lens cluster 130 may be similar to the distance between lens cluster 130 and lighting source 110. A focal length of this nature helps ensure that light emitters at lighting source 110 are in focus or substantially in focus when an illuminator including lighting source 110 is pointed at a distant object. The position of the lighting source 110, optional condenser lens 120, and lens cluster 130 in system 100 may be adjusted to allow for an emitted light pattern to be focused at a variety of distances.

Lens cluster 130 takes the light from each emitter and focuses that light onto a number of points. Each lens in the lens cluster 130 may be used to focus the light of each emitter from illuminator light source 110 onto a different point. The theoretical number of points that may be created by shining the lighting source 110 through the lens cluster 130 is equal to the number of emitters in the lighting source multiplied by the number of lenses in the lens cluster 130. For example, a lighting source 110 with 200 LEDs and a lens cluster 130 with 36 lenses can create up to 7200 distinct points of light. An illuminator, lamp, or projector utilizing the present lens system 100 may create a high resolution texture that is useful to a computer vision system.

All the lenses in the lens cluster 130 may have a similar focal length. This similarity in length may better ensure that the pattern is focused together onto an object illuminated by the light source 110 (e.g., a pattern illuminator). Lenses may have somewhat different focal lengths so at least some of the pattern is in focus at different distances. In some instances, a semi-random or random pattern may be desirable to the functioning of the computer vision system. In such an instance, the lenses within the lens cluster 130 may displace the focused image by different distances to the side.

FIG. 2 illustrates a number of semi-random light configurations (210-230) for lighting source 110 of FIG. 1. The light configuration patterns may likewise be used to create a desired random or semi-random pattern as referenced above. In the patterns 220-230 illustrated in FIG. 2, each black 'dot' is representative of an emission of light (i.e., a light emitter). It should be noted that the black 'dots' are merely exemplary for the purpose of FIG. 2. The black 'dots' need not necessarily emit 'black light' or focused 'dots' of light although various types of light, frequencies, and patterns within the pattern (e.g., dots versus squares versus asymmetric blobs) may be emitted from light source 110 and any constituent light emitters.

In that regard, potential light sources for emission of light are inclusive of light emitting diodes, laser diodes, incandescent bulbs, metal halide lamps, sodium vapor lamps, organic light emitting diodes (OLEDs), and pixels of a liquid crystal display (LCD) screen. The emitter(s) at light source 110 may be a backlit slide or backlit pattern of holes. In an embodiment like that of FIG. 1, each emitter (i.e., each dot) 'aims' the light along a cone toward the lens cluster 130 or intermediate and optional condenser lens 120.

The pattern of illuminators may be randomized to varying degrees. For example, pattern 210 illustrates a rectangular grid of emitters with some removed at random. Pattern 220 illustrates a rotated grid of emitters with the columns shifted random amounts and random emitters removed. Pattern 230 consists of a randomly positioned, tight packing of emitters with a random set of emitters removed. The density of emitters on the light source varies across a variety of spatial scales. This variation in emitter density helps ensure that the emitters at light source 110 will create a pattern that varies in brightness even at distances where the emitted pattern is not entirely in focus.

The light source 110 of FIG. 1 and the pattern embodiments illustrated in FIG. 2 (210-230) are generally rectangular in shape. This rectangular configuration of the light source 110 in conjunction with a design of the lens cluster 130 helps create a pattern that roughly covers an otherwise rectangular area. The use of rectangular light sources 110 and constituent patterns facilitates clustering of illuminators thereby covering broad areas without significant overlap. Nevertheless, other shapes may be used with respect to illuminator patterns and light source 110 configurations and overlap of patterns may be desirable and incurred.

The light source 110 may also be positioned on a motorized mount. Through such a mounting, the light source 110 may move or rotate thus creating further variation and control as to emitted light patterns and focus of the same at varying distances. Emitters in the patterns (210-230) may be turned on or off via an electronic control system thereby allowing the pattern emitted from the light source 110 to vary. The emitter pattern, too, may be regular (e.g., with no variance in layout or pattern) but the pattern of emitters that are in an 'on state' at any given time may be random.

As initially noted above, different frequencies of light may be emitted from light source 110 with respect to emitting light in a particular pattern such as those illustrated in FIG. 2. Near-infrared, far-infrared, visible, and ultraviolet light are just some of the various light frequencies that may be emitted subject to a particular choice of light emitter. A number of different frequencies of light may be emitted from a single pattern (e.g., one 'dot' may emit light at a near-infrared frequency while another 'dot' emits light at an ultraviolet frequency). The light source 110 may be strobed in conjunction with the camera(s) of a corresponding computer vision system thereby allowing the presence and effects of ambient light to be reduced.

The pattern, frequency, strobing, and other manipulations of emitted light may be particularly useful with respect to operating a vision system like that disclosed in the '737 application. In a system like that disclosed in the '737 application, an interactive video display system allows a physical object to interact with a virtual object. A light source delivers a pattern of invisible light to a three-dimensional space occupied by the physical object and a camera detects invisible light scattered by the physical object. A computer system analyzes information generated by the camera, maps the position of the physical object in the three-dimensional space, and generates a responsive image that includes the virtual object, which is then rendered on a display. Utilizing the present lens system to project a pattern of invisible light may improve the accuracy and utility of such a vision system.

Figure 3:
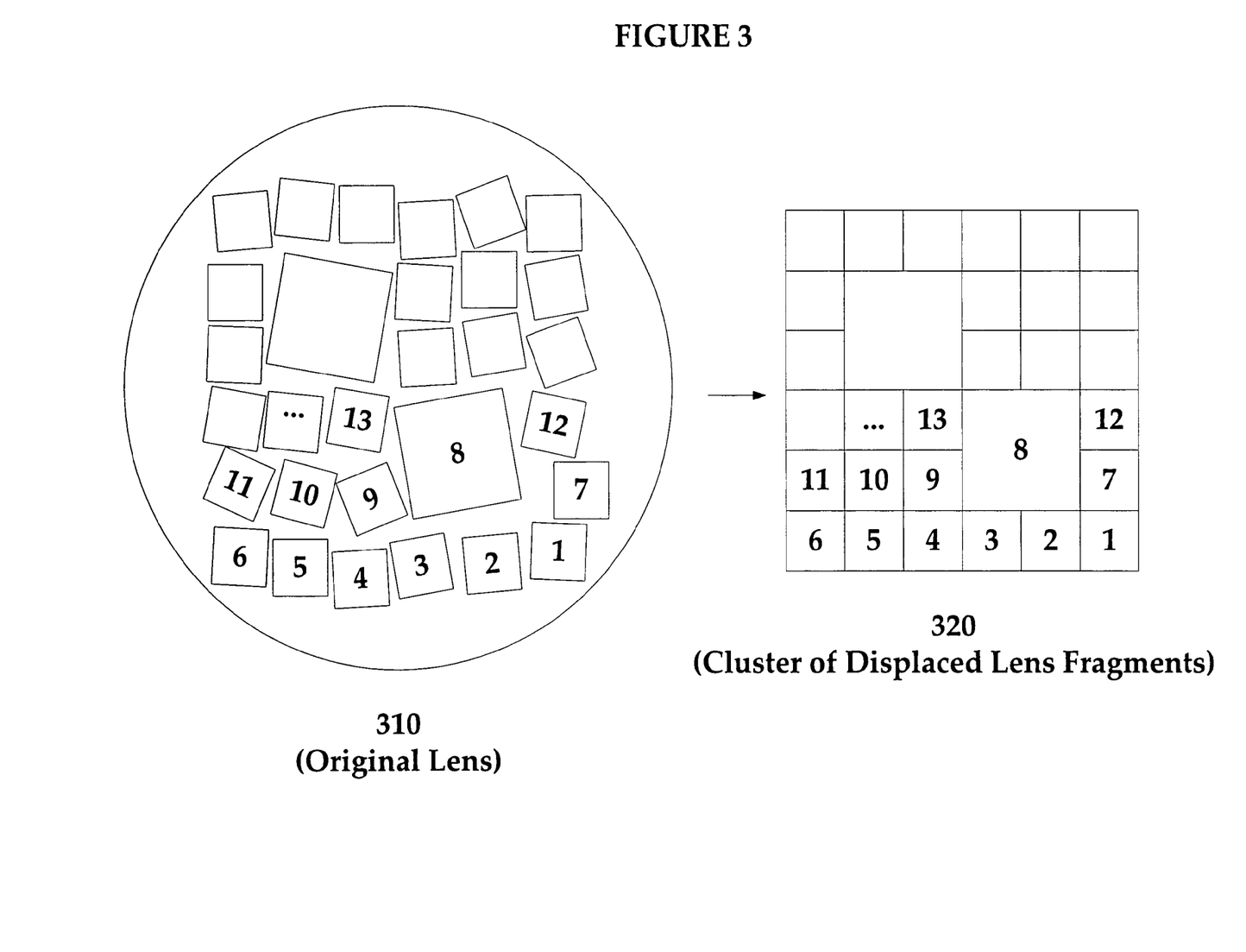
FIG. 3 illustrates the assembly of a lens cluster like that of FIG. 1.

FIG. 3 illustrates the assembly of a lens cluster like lens cluster 130 in FIG. 1. In element 310, a lens is illustrated that has had several square columns removed. These removed square pieces are then reassembled into a lens cluster (like that of FIG. 1) as shown in element 320. The varying angles and displacements of these squares have ensured some randomness in the focal points of the lenses in the cluster. In FIG. 3, the rough spatial positioning of the squares (shown with the corresponding pieces numbered 1 to 13) has been preserved. While this positioning is not necessary, this arrangement does provide the advantage of helping ensure that copies of each emitter that are projected as bright dots by the lens cluster are not too far apart. Further, this arrangement helps create a roughly rectangular shape to the overall pattern.

As is also evident in FIG. 3, there are multiple sizes of squares in the diagram (e.g., square [1] versus square [8]). While not necessary, this difference in size helps the computer vision system to process a variety of illumination levels. If the square is larger, the dots produced by the pattern will be brighter. By mixing large and small squares, the pattern becomes a mix of dense dimmer dots and sparse brighter dots. The computer vision system may then see some texture from the illuminator in conditions with high ambient illumination while having high resolution texture when the ambient illumination is low.

The lens cluster need not be constructed in this method. The lens cluster may be constructed of regular lenses, Fresnel lenses, or a mix of lenses. The lenses may or may not have a square cross-sectional shape. The lenses may or may not be different sizes. Although FIG. 3 shows a lens being cut apart to construct the lens cluster, it may be fabricated by casting from a mold, machining, or another technique. The 'pieces' of the lens from which the lenses in the cluster are derived may or may not overlap.

If the lenses in the lens cluster focus light onto different points, the emitter may not need to be completely random. For example, if there are a small number of bright emitters in a grid pattern and a large number of lenses in the lens cluster, the light produced by the illuminator can still be semi-random. Repetition would show up over very large length scales.

Figure 4:
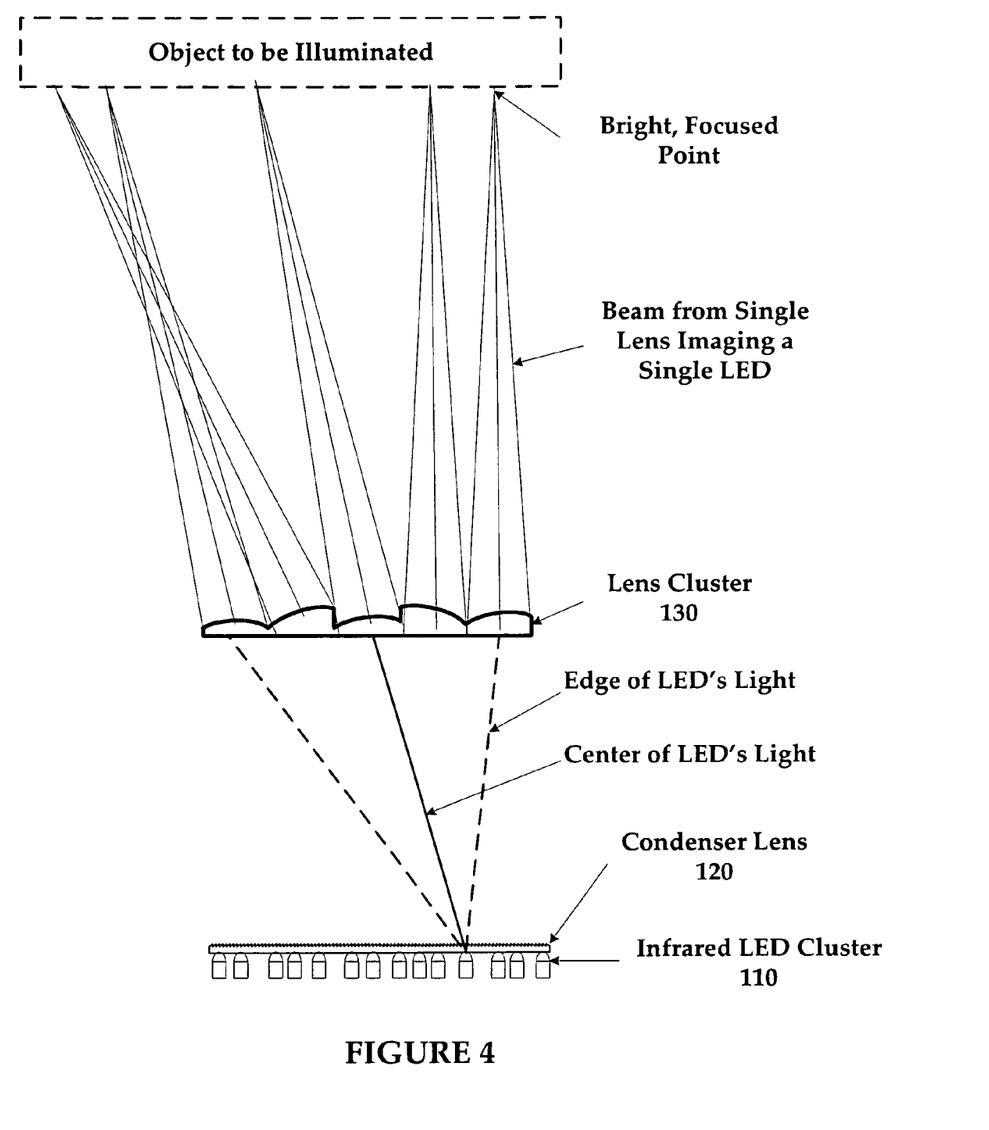
FIG. 4 illustrates a cross-sectional illustration of light as created by an LED in an illuminator light source.

FIG. 4 illustrates a cross-sectional illustration of light as created by an LED in an illuminator light source. It should be noted that the dimensions of FIG. 4 are not to scale. In a real-world scenario, the object and focal plane are typically further away from a lens cluster. As such, FIG. 4 should be considered exemplary for the purpose of aiding understanding of the present disclosure.

In FIG. 4, light is emitted in a cone from an LED in the infrared LED cluster 110, which corresponds to lighting source 110 of FIG. 1. The light path is redirected toward the center of the lens cluster by the condenser lens 120, which likewise corresponds to the optional condenser lens of FIG. 1. When the light cone hits the lens cluster 130 (which corresponds to cluster 130 of FIG. 1), different parts of the LED light are focused onto different locations on a distant plane. This causes several bright spots to be created from the light of a single LED. When all the light from all the LEDs is tracked, the result is a dense overlapping pattern of focused light beams creating a discernable pattern that may be detected by a camera(s) and processed by a corresponding computing device.

The use of infrared light (or other types of non-visible or substantially invisible light) may prove useful in that it may be invisible (or nearly invisible) to the human eye of an observer interacting with an illuminated object. In this way, the illuminated object is not obscured by an illumination pattern nor or does the overall appearance of the object appear to have been altered. Notwithstanding, a computing device coupled to a camera may detect the pattern in order to track the object and interactions with the same with an increased degree of accuracy.

While the present invention has been described in connection with a series of exemplary embodiments, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A system for projecting a pattern of light, the system comprising:
   a light source including a plurality of emitters configured to emit light, the plurality of emitters arranged in a pattern; and
   a cluster of lenses comprising a plurality of lenses, wherein at least some of the lenses of the cluster of lenses have different focal lengths and each lens of the cluster of lenses is configured to focus the emitted light from each of the plurality of emitters into a plurality of points that form a light pattern, wherein at least some of the focused light falls on a portion of a human and at least some of the focused light that falls on the portion of the human is detectable by one or more imaging devices in order to determine a position of the human.

2. The system of claim 1, wherein a quantity of the plurality of points in which the emitted light is focused is substantially equal to a quantity of lenses in the cluster of lenses multiplied by a quantity of the emitters.

3. The system of claim 1, wherein the plurality of emitters are arranged in a random pattern.

4. The system of claim 1, wherein the plurality of emitters are configured to be activated in a random spatial pattern.

5. The system of claim 1, wherein at least one emitter in the plurality of emitters is configured to be strobed.

6. The system of claim 1, wherein the plurality of emitters are arranged in a non-uniform arrangement.

7. The system of claim 1, further comprising a condenser lens configured to concentrate the emitted light on a predetermined location of the cluster of lenses.

8. The system of claim 1, wherein the cluster of lenses comprises a plurality of pieces of a single lens reassembled in a different configuration from an original configuration of the single lens.

9. The system of claim 7, wherein the predetermined location is a center of the cluster of lenses.

10. The system of claim 8, wherein a first piece and a second piece of the plurality of pieces are differently sized.

11. A method for projecting a light pattern, the method comprising:
   emitting light from a plurality of light emitters;
   directing the emitted light towards a lens cluster comprising a plurality of lenses, wherein at least some of the lenses have different focal lengths; and
   focusing the emitted light onto a plurality of points, wherein each lens of the lens cluster focuses the emitted light from each of the plurality of light emitters into a pattern of light that is at least semi-random, wherein at least some of the focused light falls on a portion of an object and is detectable by an imaging device.

12. The method of claim 11, wherein the plurality of light emitters are arranged in a rectangular grid of light emitters with at least one light emitter randomly removed.

13. The method of claim 11, wherein the plurality of light emitters are arranged in a rotated grid of light emitters with columns shifted by random amounts and with at least one light emitter randomly removed.

14. The method of claim 11, wherein the plurality of light emitters are randomly positioned in a tightly packed pattern of light emitters with at least one light emitter randomly removed.

15. The method of claim 11, wherein the plurality of light emitters that emit light are configured to manipulate one or more of the pattern, frequency, or strobing of the emitted light.

16. The method of claim 11, wherein the plurality of light emitters are arranged in a non-uniform arrangement.

17. The method of claim 11, wherein a quantity of the plurality of points in which the emitted light is focused is substantially equal to a quantity of lenses in the cluster of lenses multiplied by a quantity of the light emitters.

18. The method of claim 11, wherein the light emitted from at least one light emitter is emitted in a cone configuration substantially perpendicular to a surface upon which the at least one light emitter is mounted.

19. The method of claim 11, wherein the lens cluster comprises a plurality of pieces of a single lens reassembled in a different configuration from an original configuration of the single lens.

20. The method of claim 18, wherein a center of each light cone is directed toward a center of the lens cluster.

21. The method of claim 19, wherein a first piece and a second piece of the plurality of pieces are differently sized.

* * * * *

UNITED STATES PATENT AND TRADEMARK OFFICE
CERTIFICATE OF CORRECTION

PATENT NO. : 8,159,682 B2  Page 1 of 1
APPLICATION NO. : 12/269849
DATED : April 17, 2012
INVENTOR(S) : Bell It is certified that error appears in the above-identified patent and that said Letters Patent is hereby corrected as shown below:

On the Title Page, in item (56), under "U.S. PATENT DOCUMENTS", in Column 2, Line 10, delete "Rubstov et al." and insert -- Rubtsov et al. --, therefor.

On Page 3, in item (56), under "FOREIGN PATENT DOCUMENTS", in Column 1, Line 7, delete "2002-092033" and insert -- 2002-092023 --, therefor.

On Page 4, in item (56), under "OTHER PUBLICATIONS", in Column 1, Line 40, delete "ternational" and insert -- International --, therefor.

On Page 5, in item (56), under "OTHER PUBLICATIONS", in Column 1, Line 10, delete "Electonica" and insert -- Electronica --, therefor.

On Page 5, in item (56), under "OTHER PUBLICATIONS", in Column 1, Line 40, delete "Computig" and insert -- Computing --, therefor.

Signed and Sealed this
Second Day of October, 2012

David J. Kappos
*Director of the United States Patent and Trademark Office*